Figure 1:
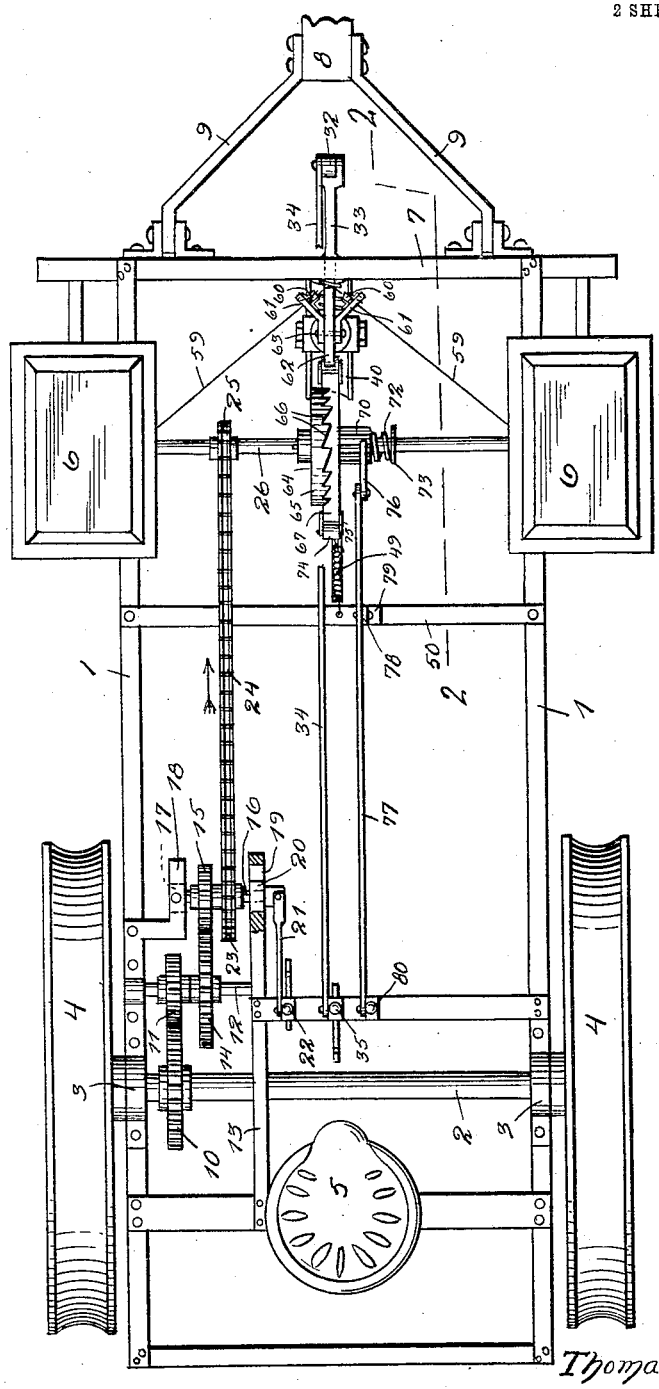

T. B. NOLAN.
COMBINED GRAIN PLANTER AND MARKER.
APPLICATION FILED DEC. 8, 1911.
1,054,136.
Patented Feb. 25, 1913.
2 SHEETS—SHEET 2.
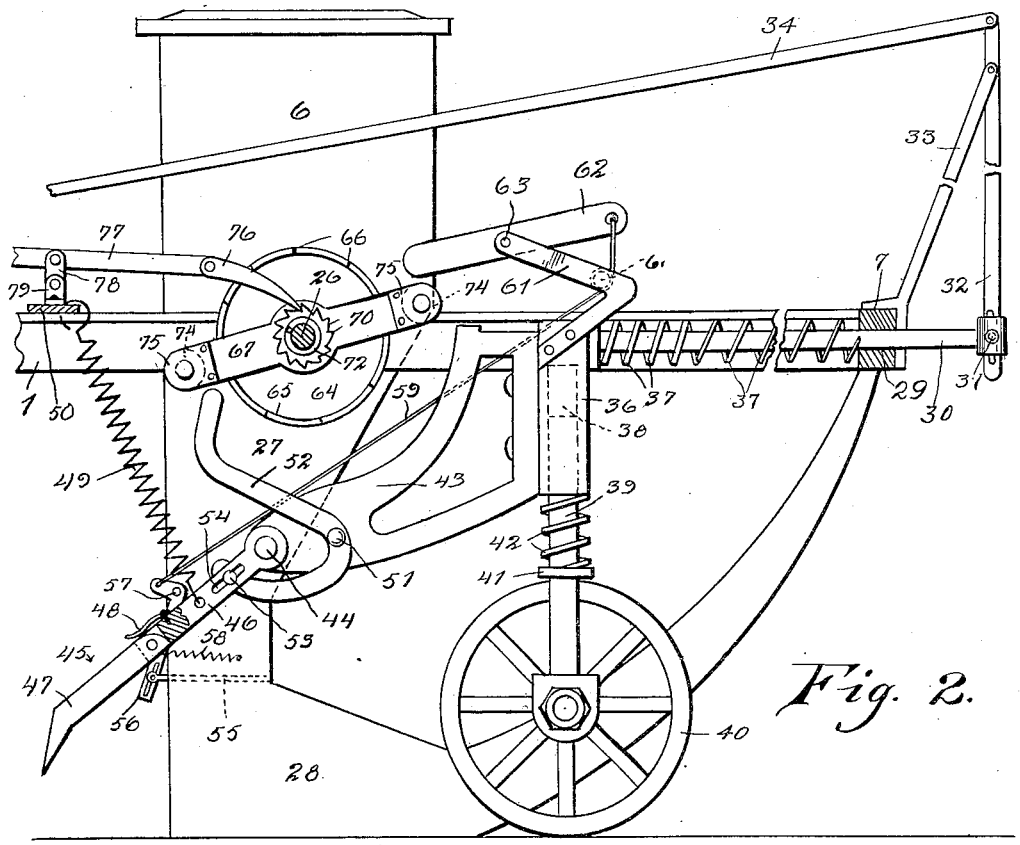
Fig. 2.
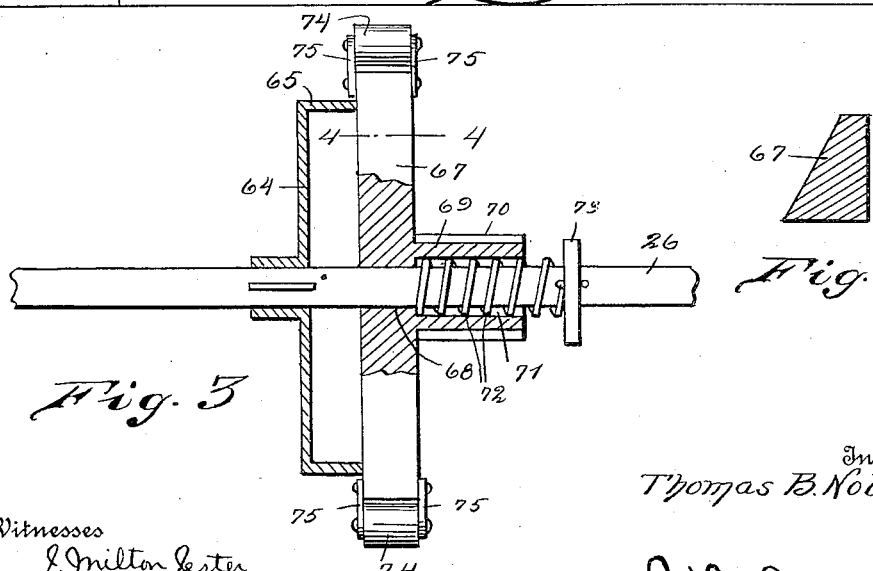
Fig. 3.
Fig. 4.
Witnesses
Inventor
Thomas B. Nolan
By C. L. Parker
Attorney

UNITED STATES PATENT OFFICE.

THOMAS B. NOLAN, OF PRATT, KANSAS.

COMBINED GRAIN-PLANTER AND MARKER.

1,054,136.      Specification of Letters Patent.      Patented Feb. 25, 1913.

Application filed December 8, 1911. Serial No. 664,569.

*To all whom it may concern:*

Be it known that I, THOMAS B. NOLAN, a citizen of the United States, residing at Pratt, in the county of Pratt and State of Kansas, have invented certain new and useful Improvements in Combined Grain-Planters and Markers, of which the following is a specification.

This invention relates to a machine for planting corn or other grain and to mark the ground near the places at which the grain is deposited.

An important object of this invention is to provide novel and simple means for operating the marker and seed feeding means.

A further object of this invention is to provide adjustable means to operate the marker and seed feeding means, whereby the grain may be properly deposited in the ground in transverse rows.

A further object of my invention is to provide a machine of the above mentioned character, which is easily controlled by the operator and highly efficient in fulfilling its function.

A further object of this invention is to provide a machine of the above mentioned character, which is simple in construction, durable and not liable to derangements.

Other objects and advantages of this invention will be apparent during the course of the following description.

In the accompanying drawings forming a part of this specification and in which like numerals are employed to designate like parts throughout the same, Figure 1 is a plan view of the entire machine, Fig. 2 is an enlarged vertical sectional view taken on line 2—2 of Fig. 1, Fig. 3 is a detail section taken through the operating disk and arm, and, Fig. 4 is a detail sectional view taken on line 4—4 of Fig. 3.

In the drawings wherein is illustrated a preferred embodiment of my invention, the numeral 1 designates a preferably rectangular main frame, having an axle 2 extending through journal boxes 3, carried by the rear portion thereof. Upon this axle are rotatably mounted traction wheels 4, as shown. Suitably mounted upon the rear portion of the frame 1, is a seat 5. Mounted upon the forward portion of the main frame are spaced seed boxes 6, as shown. Connected with a forward transverse bar 7 of the main frame, is a draft gear preferably comprising a tongue 8, having connection with angle irons 9, which are pivotally connected with the transverse bar 7, as shown.

Rigidly mounted upon the axle 2 is a pinion 10, engaging an intermediate pinion 11, rigidly mounted upon a counter-shaft 12, which is journaled through one longitudinal side of the main frame 1 and a longitudinal bar 13. Rigidly mounted upon the counter-shaft 12 is a second intermediate pinion 14, engaging a pinion 15, fast upon a stub-shaft 16. This stub-shaft has one end rotatably mounted in a journal box 17, which is pivoted to swing in a vertical plane in an opening formed in a bracket 18. The other end of this stub-shaft extends through a slot 19 formed in forward end of the bar 13 and is rotatably mounted therein, in a journal box 20. When this journal box 20 is in its normal rear position it holds the pinions 14 and 15 in operative engagement but when said journal box is moved forwardly, the pinions 14 and 15 will be disengaged. Pivotally connected with the journal box 20 is a rod 21, which in turn is pivotally connected with an operating lever 22, disposed in convenient distance from the operator's seat 5. Rigidly mounted upon the stub-shaft 16 is a sprocket wheel 23, engaged by a sprocket chain 24, extending forwardly for engagement with a sprocket wheel 25, rigidly mounted upon a forward transverse actuating shaft 26.

Each of the seed boxes 6 has connection at its lower end with a chute 27, discharging into a furrow-opener 28, the forward end of which preferably extends upwardly and is connected with the forward transverse bar 7, as shown. The seed drilling means for feeding the seed from the box 6 into the chute 27 has not been shown as it may be of any well known or preferred type. It is to be understood, however, that such means are operated by the actuating shaft 26.

The forward transverse bar 7 is provided intermediate its ends and between the seed boxes 6 with a horizontal opening 29, for receiving a longitudinally movable beam 30, having pivotal connection at its forward end, as shown at 31, with a swinging lever 32, which in turn is pivoted midway its ends with a stationary bracket or support 33, rigidly mounted upon the bar 7. Pivotally connected with the lever 32 at its upper end is a rigid rod 34, extending rearwardly for pivotal connection with a lever 35, disposed near the lever 22, as shown. The beam 30 has rigid connection at its rear end with a structure or block 36, and between this block and the bar 7 is interposed a compressible coil spring 37, as shown. The block 36 is provided with a substantially vertical opening 38, for receiving the upper end of a shaft 39, carrying a wheel 40 at its lower end, as shown. The shaft 39 is provided with a flange 41 and a compressible coil spring 42 is interposed between this flange and the block 36, as shown. Rigidly connected with the block 36 is a rearwardly and downwardly extending support or bracket 43, upon which is mounted the ground marking means to be next described.

Pivotally connected with the lower end of the bracket 43, as shown at 44, is a marker 45, preferably formed in sections 46 and 47, hinged together by a knee-joint, as shown. By this construction the section 47 may be swung rearwardly with relation to the section 46 but cannot be swung forwardly with relation thereto. The section 47 is engaged by a suitably stiff spring 48, carried by the section 46. It is to be understood that the spring 48 will prevent the marker 47 from bending midway its ends when the lower end of the section 47 is being forced into the ground, but in the event that the section 47 should encounter a stone or the like the marker will accordingly yield and hence save itself from being broken and prevent injury to other parts of the machine. The marker 45 is held in its elevated position by a retractile coil spring 49, having its lower end connected with the marker and its upper end attached to a transverse bar 50. Pivotally mounted upon the bracket 43, as shown at 51, is an operating bell-crank lever 52, having its lower end provided with a bolt 53 operating in a slot 54 formed through the upper portion of the section 46. The upper or free arm of the bell-crank lever 52 extends beyond the bracket 43, for a purpose to be described.

Each of the chutes 27 is provided with seed dropping or feeding means of any well known or preferred type and for the purpose of illustration I have shown a slide valve 55, having connection with a bell-crank lever 56, pivotally connected with the chute 27, as shown at 57. A retractile coil spring 58 returns the lever 56 to its normal position for holding the valve 55 closed. Each of the bell-crank levers 56 is swung for opening its valve by a cable 59 or other flexible element, extending upwardly and forwardly to engage a spool or roller 60. This spool or roller is carried by a bar 61, rigidly mounted upon the upper end of block 36, as shown. These bars 61 extend rearwardly and upwardly in converging relation and have a trip lever 62 disposed therebetween, said lever 62 and bars 61 being pivotally connected by a bolt 63. The cables 59 are attached to the forward end of the trip lever 62.

Keyed or otherwise rigidly mounted upon the actuating shaft 26 is an operating disk 64, provided with a laterally extending flange 65, having ratchet-teeth 66, faced, as shown. Disposed to one side of the disk 64 is an operating trip element or arm 67, having engagement with the teeth 66, as shown. The arm 67 is loosely mounted upon the actuating shaft 26 and is provided midway its ends with an opening 68, receiving the shaft 26. Formed upon the arm 67 is a sleeve 69, provided upon its periphery with ratchet-teeth 70 and having an enlarged axial opening 71 formed therethrough. Disposed within the opening 71 is a coil spring 72, engaging a ring 73 fast upon the shaft 26. The arm 67 carries at its opposite ends rollers 74, disposed between strips 75, which are rigidly connected with the arm 67.

Means are provided to rotate the sleeve 69 forwardly or in one direction, comprising a pawl 76, pivotally connected with the forward end of a rigid rod 77, having pivotal connection with a link 78, which in turn is pivoted to a fixed upstanding bracket 79. At its rear end the rod 77 is pivotally connected with an operating lever 80, disposed near and preferably in transverse alinement with the levers 22 and 35, as shown.

The operation of the machine is as follows:—The machine is drawn forwardly over the ground by suitable means (not shown) and the rotation of the traction wheels 4 is imparted through the medium of pinions 10, 11, 14 and 15 to the sprocket wheel 23, causing the sprocket chain 24 to travel forwardly, as indicated by the arrow. The sprocket chain 24 through the medium of the sprocket wheel 25 rotates the actuating shaft 26 clockwise. This actuating shaft drives the seed drilling means (not shown) for feeding the seed from the boxes 6 into the upper end of the chutes 27. The rotation of the actuating shaft 26 is imparted to the disk 64 which accordingly rotates the arm 67. Attention is called to the fact that the rear corresponding ends of the lever 62 and the lever 52 are disposed at diametrically opposite points with relation to the disk 64, whereby said levers will be simultaneously tripped by the arm 67. When the lever 62 is thus tripped its upper end is elevated, pulling on the cables 59, which swings bell-crank levers 56 for opening the valves 55. The seed dropping means is thus operated to deposit the grain in the furrow previously opened by the furrow opener 28. When the bell-crank lever 52 is engaged by the arm 67, its lower arm is swung downwardly causing the lower section 47 of the marker to enter the ground. Attention is called to the fact that the marker 45 is disposed directly behind the wheel 40, which has a grooved periphery curved in cross-section, whereby said wheel 40 first smooths or packs the ground which is subsequently marked by the section 47. After the roller 74 has disengaged the upper free end of the lever 52, the spring 49 will quickly return the marker 45 and associated elements to their normal positions. By pulling the rod 34 rearwardly, lever 32 will be swung and the beam 30 moved forwardly, whereby the rear engaging ends of levers 62 and 52 will be disposed out of the path of travel of the arm 67. The spring 37 serves to return the beam 30 to its normal position. The spring 43 forms a yielding connection between the frame 1 and the wheel 40, to compensate for the irregularities of the ground over which the machine is driven. The sprocket wheel 23 may be disconnected from the axle 2, by swinging the stub-shaft 16 forwardly, as hereinabove stated.

When starting each row the sleeve 69 is turned to cause a rotation of the arm 67 with relation to the disk 64 and shaft 26, until the free ends of the arm or the rollers engage the rear ends of elements 62 and 52, subsequently to which the machine is started. In this way the places of deposit of the grain together with the ground marks, are kept in transverse alinement. It is obvious that should the ground marks get out of transverse alinement intermediate the ends of the row, the trouble may be remedied by the turning of the arm 67, as hereinabove described.

I wish it understood that the form of my invention herewith shown and described is to be taken as a preferred example of the same, and that certain changes in the shape, size, and arrangement of parts may be resorted to without departing from the spirit of the invention or the scope of the subjoined claims.

Having thus described my invention, I claim:—

1. In a machine of the character described, a main frame, wheels for supporting the same, a support connected with the main frame and adapted to be moved longitudinally with relation thereto, a marker connected with the support, a device to operate the marker, driving connecting means between the wheels and device, and means to move said support to place said marker out of operative position with relation to the device.

2. In a machine of the character described, a main frame, wheels supporting the same, a support connected with the main frame and adapted to be moved longitudinally in relation thereto, means to effect such longitudinal movement of said support, a marking element connected with said support, a device to operate the marking element, suitable gearing between said wheels and device, and means to render said gearing operative and inoperative.

3. In a machine of the character described, a main frame, wheels supporting the same, a seed box, a chute and furrow opener connected with the seed box, seed feeding means for controlling the passage of material from the seed box into the chute, a beam so connected with the main frame that it may be moved longitudinally with relation thereto, means to move said beam longitudinally, a marking element connected with said beam, an actuating shaft, suitable driving connecting means between said actuating shaft and seed feeding means, and means to operate the marking element including a trip element connected with the actuating shaft.

4. In a machine of the character described, a wheeled frame, a beam longitudinally movably mounted through said frame, a block connected with said beam and provided with a longitudinal opening, a shaft movably mounted in the opening of the block, a wheel carried by said shaft, a spring to control the movement of said shaft in the opening, a support connected with the block, a marking element connected with said support, a rotatable element for operating said marking element, and means to effect a longitudinal movement of said beam.

5. In a machine of the character described, a wheeled frame, a beam so connected with said frame that it may be moved longitudinally with relation thereto, means to move said beam longitudinally in one direction, a spring to oppose this longitudinal movement of the beam, a support connected with the beam, a marking element pivotally connected with the support, an intermediate element pivotally connected with the support and with said marking element, and a rotatable trip element connected with the wheeled frame and disposed to operate said intermediate element.

6. In a machine of the character described, a wheeled frame, an actuating shaft carried thereby, a trip element connected with the actuating shaft, a movable support, a lever pivoted to the movable support and normally disposed to have its free end disposed in the path of travel of said trip element, a marking element connected with said movable support and lever, and means to so move said support that said lever is moved out of the path of travel of said trip element.

7. In a machine of the character described, a wheeled frame, a beam so connected therewith that it may be moved longitudinally with relation thereto, means to move the beam longitudinally in one direction, a spring to oppose this longitudinal movement of the beam, a supporting structure attached to the beam, an upstanding shaft having a portion thereof movably mounted in an opening formed in said supporting structure, a wheel connected with the upstanding shaft, a spring for controlling the movement of the upstanding shaft with relation to said supporting structure, a marking element pivoted to said supporting structure in the rear of said wheel, an intermediate lever connected with the marking element and pivotally connected with the supporting structure, and a rotatable element mounted upon the wheeled frame and provided with a roller to engage the intermediate lever.

8. In a machine of the character described, the combination with a rotatable shaft, of a disk connected therewith and provided with ratchet-teeth, an arm loosely mounted on the shaft and engaging the ratchet-teeth, rollers mounted upon opposite ends of the arm, seed dropping means including an element disposed in the path of travel of the arm, ground marking means including an element disposed in the path of travel of the arm and diametrically arranged with relation to the first named element and disk, and means to shift the elements so that they are moved out of the path of travel of the arm.

9. In a machine of the character described, the combination with a rotatable shaft, of a disk connected therewith and provided with ratchet-teeth, an arm loosely mounted on the shaft and engaging the ratchet-teeth, seed dropping means including an element disposed in the path of travel of said arm, and ground marking means including an element disposed in the path of travel of said arm.

In testimony whereof I affix my signature in presence of two witnesses.

THOMAS B. NOLAN.

Witnesses:
O. H. BOCK,
HARRY WARREN.

---

Copies of this patent may be obtained for five cents each, by addressing the "Commissioner of Patents, Washington, D. C."